US012019463B2

(12) United States Patent
Carton et al.

(10) Patent No.: US 12,019,463 B2
(45) Date of Patent: Jun. 25, 2024

(54) HUMAN-MACHINE INTERFACE

(71) Applicant: CROUZET, Valence (FR)

(72) Inventors: Hervé Carton, Valence (FR); Morgan Verdier, Valence (FR)

(73) Assignee: CROUZET, Valence (FR)

( * ) Notice: Subject to any disclaimer, the term of this patent is extended or adjusted under 35 U.S.C. 154(b) by 0 days.

(21) Appl. No.: 17/907,513

(22) PCT Filed: Feb. 17, 2021

(86) PCT No.: PCT/EP2021/053901

§ 371 (c)(1),
(2) Date: Sep. 27, 2022

(87) PCT Pub. No.: WO2021/190826

PCT Pub. Date: Sep. 30, 2021

(65) Prior Publication Data

US 2023/0350448 A1 Nov. 2, 2023

(30) Foreign Application Priority Data

Mar. 27, 2020 (FR) ...................................... 2003046

(51) Int. Cl.
*G05G 5/05* (2006.01)
*G05G 1/04* (2006.01)
*H01H 23/30* (2006.01)

(52) U.S. Cl.
CPC ................ *G05G 5/05* (2013.01); *G05G 1/04* (2013.01); *H01H 23/30* (2013.01); *G05G 2505/00* (2013.01)

(58) Field of Classification Search
None
See application file for complete search history.

(56) References Cited

U.S. PATENT DOCUMENTS

| | | |
|---|---|---|
| 2,761,026 A | 8/1956 | Youhouse |
| 3,303,311 A | 2/1967 | Streuer |

(Continued)

FOREIGN PATENT DOCUMENTS

| | | | |
|---|---|---|---|
| EP | 2509090 A1 | 10/2012 | |
| FR | 3051927 A1 | 12/2017 | |

(Continued)

OTHER PUBLICATIONS

International Search Report for International Application No. PCT/EP2021/053901, mailed May 11, 2021, 06 pages (including English translation).

(Continued)

*Primary Examiner* — Vicky A Johnson
(74) *Attorney, Agent, or Firm* — TraskBritt

(57) ABSTRACT

A human-machine interface comprises a return mechanism for returning a utensil to its neutral position. The return mechanism comprises a rocker suspended on first and second springs. This rocker is rotatable about a second axis and comprises first and second side-wings that are each situated on a respective side of a median plane containing a first axis about which the utensil rotates. These first and second side-wings comprise first and second regions for accommodating one end of the first and second springs, respectively, the orthogonal projection of the second accommodating region, in a plane containing the first and second axes being situated entirely between the first and second axes.

12 Claims, 3 Drawing Sheets

(56) References Cited

U.S. PATENT DOCUMENTS

| | | | | |
|---|---|---|---|---|
| 3,394,611 | A | 7/1968 | Beurrier | |
| 3,794,785 | A | 2/1974 | Tomlinson | |
| 6,080,941 | A | 6/2000 | Yokobori | |
| 7,838,789 | B2 * | 11/2010 | Stoffers | H01H 23/30 200/339 |
| 10,073,489 | B2 * | 9/2018 | Wuisan | G05G 5/05 |
| 11,409,321 | B2 | 8/2022 | Carton | |
| 2003/0029706 | A1 | 2/2003 | Gillman et al. | |
| 2008/0053806 | A1 | 3/2008 | Stoffers et al. | |
| 2009/0114517 | A1 | 5/2009 | Altmann et al. | |
| 2009/0301255 | A1 * | 12/2009 | Chanteloup | H01H 23/30 74/504 |
| 2019/0189373 | A1 | 6/2019 | Abdelli et al. | |

FOREIGN PATENT DOCUMENTS

| | | | |
|---|---|---|---|
| GB | 1093390 | A | 11/1967 |
| GB | 2331850 | A | 6/1999 |
| JP | 58-099734 | U | 7/1983 |
| JP | 2009-117361 | A | 5/2009 |
| WO | 2021/190826 | A1 | 9/2021 |

OTHER PUBLICATIONS

International Written Opinion for International Application No. PCT/EP2021/05390, mailed May 11, 2021, 11 pages (including English machine translation).

* cited by examiner

HUMAN-MACHINE INTERFACE

CROSS-REFERENCE TO RELATED APPLICATIONS

This application is a national phase entry under 35 U.S.C. § 371 of International Patent Application PCT/EP2021/053901, filed Feb. 17, 2021, designating the United States of America and published as International Patent Publication WO 2021/190826 A1 on Sep. 30, 2021, which claims the benefit under Article 8 of the Patent Cooperation Treaty to French Patent Application Serial No. FR2003046, filed Mar. 27, 2020.

TECHNICAL FIELD

The disclosure relates to a human-machine interface.

BACKGROUND

Known human-machine interfaces comprise:

a fixed body, a utensil that is rotatable, by a user, about an axis, between a neutral position and an inclined position, the neutral position being the position of the utensil in the absence of exterior stress on this utensil, and a return mechanism for returning the utensil to its neutral position, this return mechanism comprising first and second springs that permanently urge the utensil to its neutral position.

For example, such a human-machine interface may be a thumbwheel switch such as described in patent application EP2509090. In the case of this thumbwheel switch, the utensil movable by the user's hand is a thumbwheel actuator. This thumbwheel actuator is returned to its neutral position by two springs that are wound around the axis of rotation of the thumbwheel actuator. In this type of human-machine interface, as soon as one of the two springs breaks, the thumbwheel actuator no longer returns to its neutral position and the human-machine interface is no longer usable.

Prior art is also known from U.S. Pat. No. 2,761,026A, US2019/189373A1 and JP2009117361A. In these human-machine interfaces, when the utensil is rotated in one direction, a rocker is rotated about another axis in the opposite direction.

Prior art is also known from FR3051927 and JPS5899734U.

BRIEF SUMMARY

Embodiments of the disclosure aim to overcome the aforementioned drawback by providing a more robust human-machine interface. The subject of the disclosure therefore includes such a human-machine interface as claimed in the independent claim herein.

BRIEF DESCRIPTION OF THE DRAWINGS

Embodiments of the disclosure will be better understood on reading the following description, which is given solely by way of non-limiting example, with reference to the drawings, in which.

In these figures, the same references have been used to designate elements that are the same. In the remainder of this description, features and functions that are well known to those skilled in the art are not described in detail.

DETAILED DESCRIPTION

In this description, detailed examples of embodiments are first described in Section I with reference to the figures. Next, in the following section, Section II, variants of these embodiments are presented. Lastly, the advantages of the various embodiments are presented in Section III.

Section I. Examples of Embodiment

Figure 1:
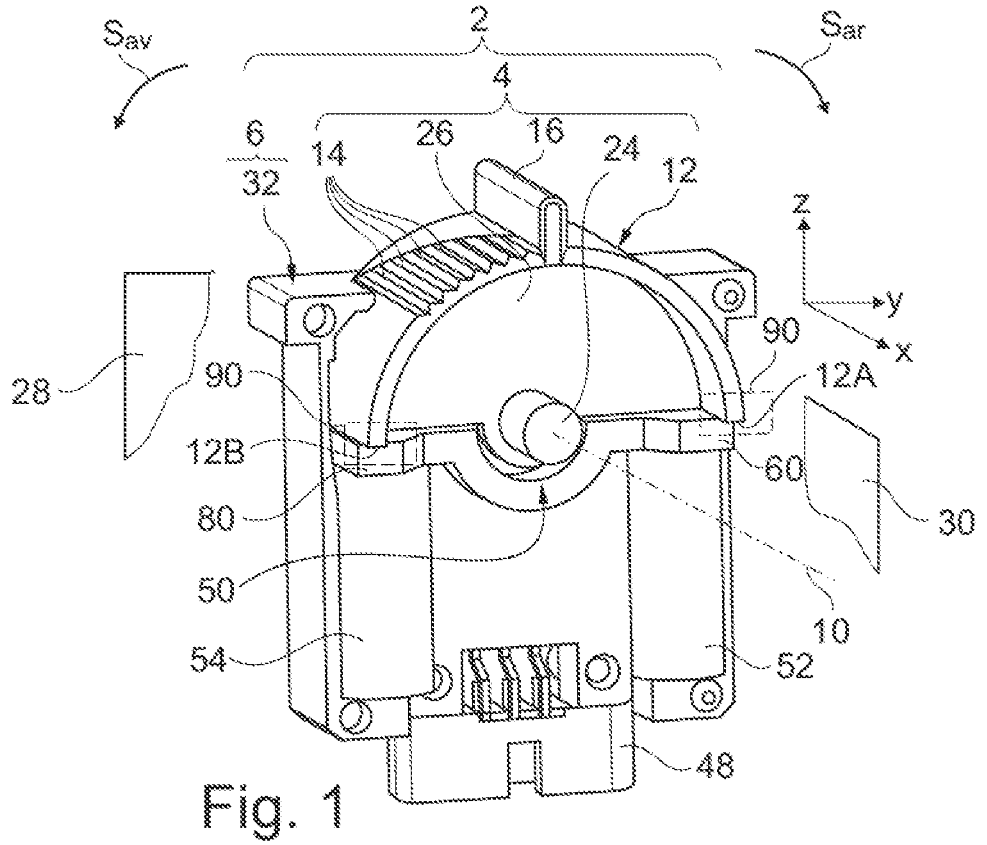
FIG. 1 is a partial illustration, in perspective, of a human-machine interface.
Figure 2:
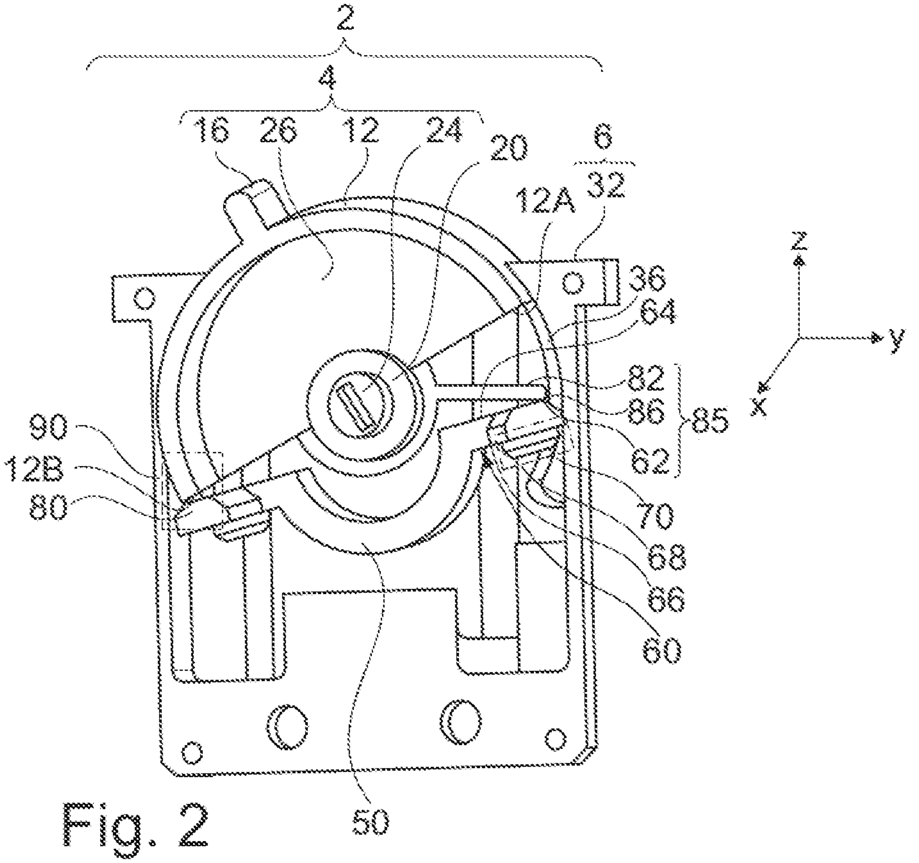
FIG. 2 is a partial illustration, in perspective, of a subset of elements of the human-machine interface of FIG. 1.
Figure 3:
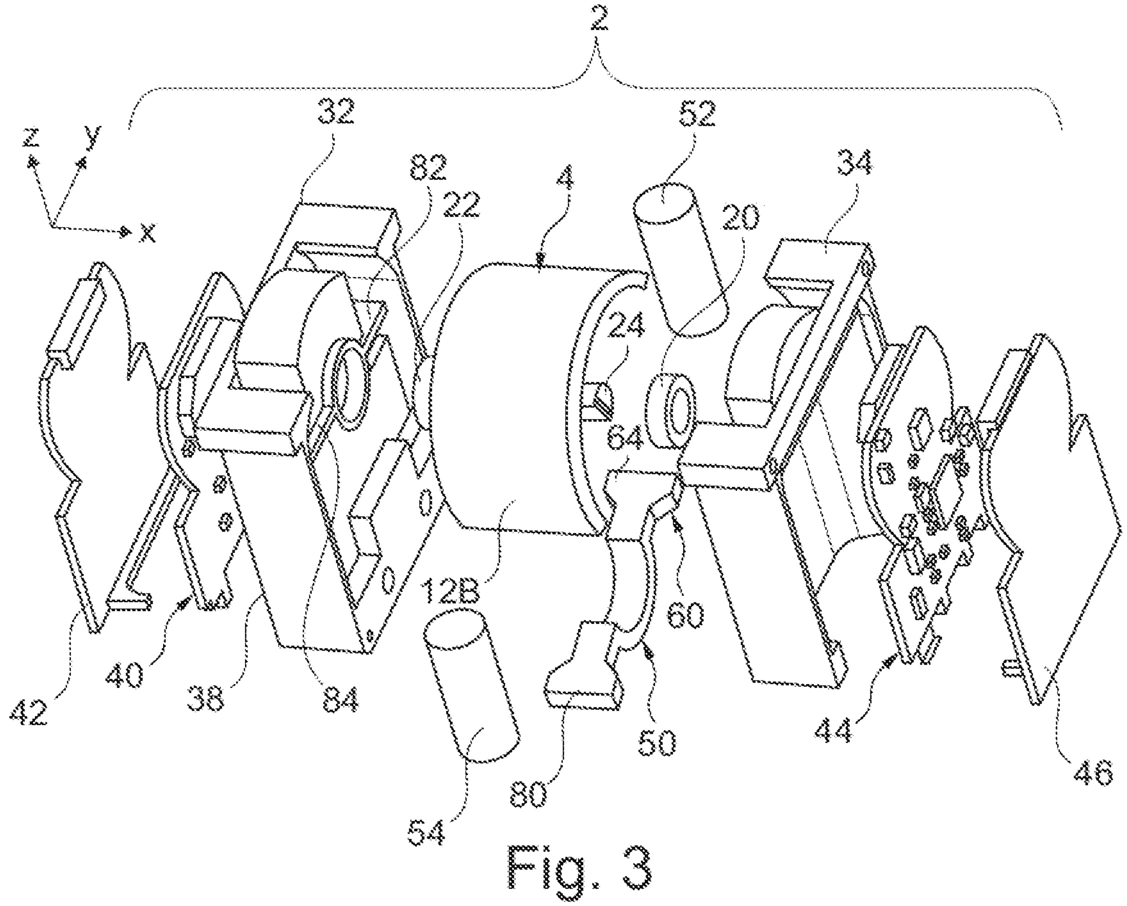
FIG. 3 is an exploded perspective illustration of the various elements of the human-machine interface of FIG. 1.

FIGS. 1 to 3 show a human-machine interface 2 comprising a utensil 4 the rotation of which is guided inside a body 6. Here, the utensil 4 is a thumbwheel actuator. The interface 2 is therefore a thumbwheel switch. The utensil 4 is mounted so as to only rotate about a single axis 10. The axis 10 is parallel to an X-direction of an orthogonal coordinate system XYZ. The axis 10 is systematically immobile with respect to the body 6.

In this coordinate system XYZ, the X- and Y-directions are horizontal and the Z-direction is vertical. Below, terms such as "top," "bottom," "upper" and "lower" and the like are defined with respect to the vertical Z-direction. The terms "left" and "right" are defined with respect to the Y-direction and a vertical median plane 30 of the interface 2. Thus, the term "right" or "right-hand" refers to everything located to the right of the plane 30 when the Y-direction points to the right. Below, the coordinate system XYZ is used to orient each of the figures.

The utensil 4 is accessible from the exterior of the body 6, so as to be directly actuatable by the hand of a user. To this end, in this embodiment, the utensil 4 comprises a semi-circular face 12 the axis of revolution of which coincides with the axis 10. The face 12 extends around the axis 10 from a lower slide 12A to another lower slide 12B. Here, these portions 12A and 12B are called "slides" because, as described below, they form part of a sliding link. The angle between a first plane containing the axis 10 and the slide 12A and a second plane containing the axis 10 and the slide 12B is larger than 45° or 90° and, generally, smaller than 270° or 200°. Here, this angle is equal to 180°.

In this example embodiment, notches 14 (FIG. 1) protrude inward from the face 12.

In this embodiment, the utensil 4 also includes a lever 16 that protrudes outward from the face 12. In a neutral position, this lever 16 extends essentially vertically. The lever 16 may be gripped by the fingers of the user with a view to rotating the utensil 4 about the axis 10 in a forward direction SAv and, alternatively, in a reverse direction SAR. The forward direction SAV and reverse direction SAR have been represented by arrows identified by the symbols SAV and SAR in FIG. 1, respectively. Here, the direction SAV is counter-clockwise and the direction SAR is clockwise.

The utensil 4 pivots, about the axis 10 and in the direction SAV, from the neutral position, shown in FIG. 1, to a first inclined position shown in FIG. 2. The utensil 4 is also capable of pivoting, about the axis 10 and in the direction SAR, from the neutral position, to a second inclined position. Typically, this second inclined position of the utensil 4 is symmetric to the first inclined position with respect to a vertical plane 30 (FIG. 1). The plane 30 contains the axis 10 and extends parallel to the X- and Z-directions. The plane 30 also passes through the lever 16 when the utensil is in its neutral position.

The neutral position is the position that the utensil 4 occupies in the absence of exterior stress. The angular offset $\alpha_{AV}$ between the neutral position and the first inclined position is here comprised between 15° and 90° or between 20° and 45°.

To limit friction between the utensil 4 and the axis 10, the utensil 4 is mounted on the axis 10 by way of two ball bearings 20, 22 (FIGS. 2 and 3). To this end, the utensil 4 comprises a shaft 24 that extends along the axis 10. Each end of the shaft 24 is fastened, with no degree of freedom, to an interior periphery of the ball bearings 20 and 22.

The shaft 24 is mechanically connected to the face 12 by a partition 26. The partition 26 extends in a vertical plane 28 (FIG. 1) parallel to the Y- and Z-directions. Here, the partition 26 is a half-disc the center of which is situated on the axis 10.

The plane 28 is a plane of symmetry of the interface 2. In the neutral position, the interface 2 is also symmetric with respect to the plane 30. Thus, below, only the elements of the interface 2 situated behind the plane 28 and to the right of the plane 30 are described in detail. The other elements may be deduced by symmetry.

The exterior periphery of the ball bearings 20, 22 is fastened with no degree of freedom to the interior of respective holes provided in rigid half-shells 32 and 34, respectively (FIG. 3).

The half-shells 32 and 34 interlock along a coupling plane here coincident with the plane 28. When these half-shells 32, 34 have been interlocked, they form the body 6.

The half-shell 32 is shaped to guide and limit the angular amplitude of the movement of the utensil 4. For example, the half-shell 32 comprises a circular groove 36 (FIG. 2) inside of which a vertical edge of the face 12 slides when the utensil 4 moves between the first and second inclined positions. The end of this groove 36 forms a stop that prevents the utensil 4 from moving beyond the first and second inclined positions. Thus, the groove 36 defines the angular amplitude of the movement of the utensil 4.

The half-shell 32 comprises a vertical exterior face that faces away from the plane 28. This exterior face comprises an exterior housing 38 (FIG. 3) able to receive a circuit board 40 (FIG. 3). The circuit board 40 typically comprises a sensor that measures the angular position of the utensil 4 about the axis 10.

The interface 2 also comprises a cover 42 (FIG. 3) that covers and protects the circuit board 40.

Similarly, a circuit board 44 (FIG. 3) is received in the exterior housing of the half-shell 34. The circuit board 44 is covered by a cover 46 (FIG. 3). The circuit board 44 is for example identical to the circuit board 40 so as to ensure redundancy in the measurement of the angular position of the utensil 4.

The circuit boards 40 and 44 are electrically connected to a connector 48 (FIG. 1) via which the angular positions of the utensil 4 measured by these circuit boards are delivered.

The interface 2 comprises a return mechanism that permanently urges the utensil 4 to its neutral position. This mechanism comprises two return springs 52 and 54 (FIGS. 1 and 3) and a rocker 50 suspended on these two return springs 52 and 54. For example, the springs 52 and 54 are coil springs the turns of which are wound about a respective central axis. In FIG. 2, the springs 52 and 54 have not been shown for the sake of legibility of this figure.

The rocker 50 is movable between:

a rest position, which is shown in FIG. 1;

a first tilted position, which is shown in FIG. 2; and a second tilted position.

The second tilted position is symmetric to the first tilted position with respect to the plane 30.

In the rest position, the rocker 50 holds the utensil 4 in its neutral position. In the first tilted position (FIG. 2), the rocker 50 permanently urges the utensil 4 in the direction SAR in order to return it from its first inclined position to its neutral position. In the second tilted position, the rocker 50 permanently urges the utensil 4 in the direction SAv in order to return it from the second inclined position to the neutral position.

The right-hand portion of the rocker 50 comprises a side-wing 60. The side-wing 60 comprises a segment that, in the rest position, extends in a horizontal plane passing through the axis 10 and in the Y-direction up to a fulcrum 62. On the side opposite the fulcrum 62, the side-wing 60 comprises a circularly arcuate segment that skirts the shaft 24.

The side-wing 60 comprises an upper flat 64 and a lower face 66 that both extend in a horizontal plane in the rest position. The lower face 66 comprises an accommodating region 68 for receiving the upper end of the spring 52. Here, the region 68 comprises a cylindrical pin 70 able to fit inside the coils of the spring 52. The lower end of the spring 52 rests on a flat formed in the lower portion of the half-shell 32. Each of the springs 52 and 54 is dimensioned to return, on its own, the rocker 50 to its rest position from either of the first and second tilted positions.

In FIGS. 1 to 3, the side-wing that is symmetric to the side-wing 60 in the rest position, has been designated by the reference 80.

In the rest position, the fulcrum 62 of the side-wing 60 is pushed against an abutment 82 of the half-shell 32 by the spring 52. The abutment 82 is a projection formed in the interior face of the half-shell 32, i.e. in the face of the half-shell 32 that faces toward the plane 28. The abutment 82 extends horizontally in the X-direction so that its end is situated above the fulcrum 62. The length of the abutment 82 in the X-direction is also short enough not to hinder the movement of the utensil 4 when it moves to the second inclined position. Thus, the abutment 82 is short enough to allow the partition 26 to pass when the utensil 4 is moved to the second inclined position. Likewise, the abutment 82 is also arranged so as not to hinder the movement of the face 12. To this end, here, the abutment 82 is situated between the hole that receives the ball bearing 22 and the groove 36.

The half-shell 32 also comprises an abutment 84 (FIG. 3) that is symmetric to the abutment 82 with respect to the plane 30.

The fulcrum 62 and the abutment 82 are also designed to form, via interaction of their shapes, when the utensil 4 moves to its first inclined position, a hinge 85 (FIG. 2). The hinge 85 allows the rocker 50 to pivot about an axis 86 (FIG. 2) from its rest position to its first tilted position. The axis 86 is separate from and parallel to the axis 10.

For this purpose, the fulcrum 62, in an active position, remains in contact with the abutment 82 while the rocker 50 moves between its rest position and its first tilted position. The fulcrum 62 is then situated on the axis 86. When, conversely, the rocker 50 moves from the rest position to its second tilted position, this fulcrum 62 moves to a distant position in which it no longer makes contact with the abutment 82.

In the rest position, the orthogonal projection of the accommodating region 68 in the horizontal plane containing the axes 10 and 86 is entirely situated between these two axes. Thus, the point of application of the return force of the spring 52 to the rocker 50 is situated between the axes 10 and 86. This point of application corresponds to the point where a discrete force of same direction and of same amplitude as the one exerted by the spring 52 on the rocker 50 produces exactly the same effects as the return force exerted by the spring 52. In this embodiment, this point of application is situated at the intersection of the central axis of the spring 52 and of the lower face 66 of the side-wing 60. The shortest distance between this point of application of the return force and the axis 86 is larger than 1 mm, 2 mm or 3 mm. Generally, this shortest distance is also smaller than 3 cm or 1 cm.

To move the rocker 50 between its rest position and its first and second tilted positions, the interface 2 comprises a sliding link 90 that mechanically links the utensil 4 to the rocker 50. This sliding link allows the utensil 4 to drive the rocker 50 to move against the return forces of the springs 52 and 54. It also allows the rocker 50 to drive the utensil 4 to move.

Here, the sliding link is formed from first and second portions that are symmetric with respect to the plane 30 in the neutral position. The first portion is situated to the right of the plane 30. This first portion comprises the upward-facing flat 64 of the side-wing 60 and the slide 12A of the semi-circular face 12. More precisely, the fulcrum 62 of the side-wing 60 is situated beyond the groove 36. Thus, when the utensil 4 pivots from its neutral position to its second inclined position, the slide 12A moves to press against the flat 64 and slides over this flat 64 in a direction parallel to the plane 28. Conversely, when the utensil 4 pivots from its neutral position to its first position, the slide 12A moves away from the flat 64 as shown in FIG. 2. Thus, the first portion of the sliding link is movable, by the utensil 4, between an engaged position in which the slide 12A slides over the flat 64 and a disengaged position in which the slide 12A is distant and mechanically isolated from the flat 64.

In the rest position, the slides 12A and 12B of the face 12 simultaneously press against the flats of the side-wings 60 and 80, respectively. Thus, as soon as a user moves the utensil 4 from its neutral position, in the direction SAR or in the direction SAv, this immediately drives the rocker 50 to rotate in the same direction. Outside of the rest position, only one of the slides 12A, 12B presses against the flat of a side-wing of the rocker 50.

Figure 4:
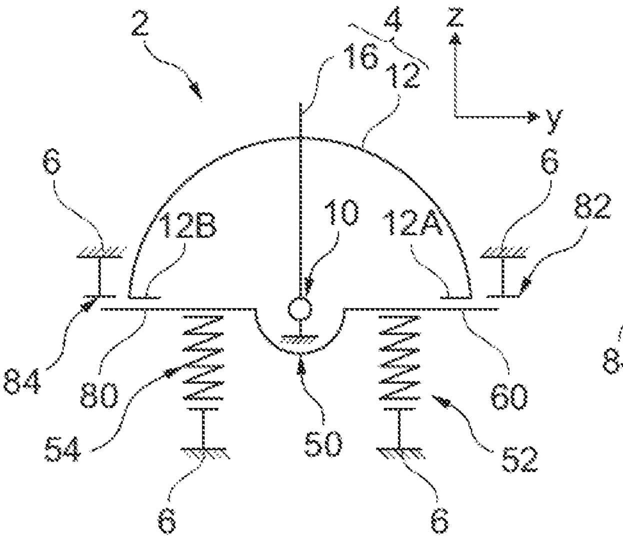
FIGS. 4 and 5 are functional diagrams of the human-machine interface of FIG. 1.
Figure 5:
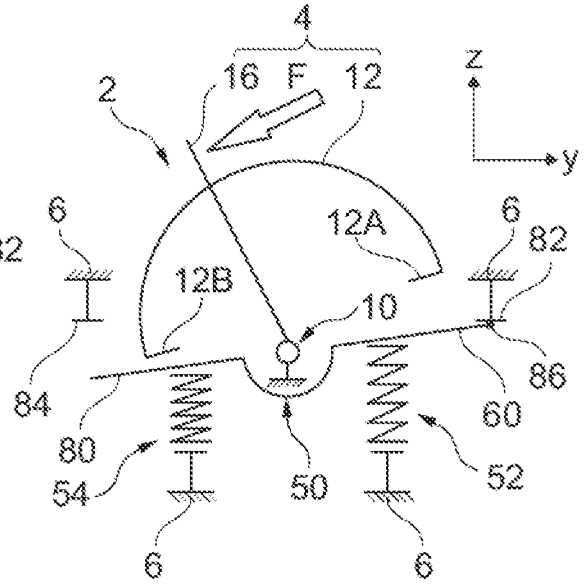

The operation of the interface 2 will now be described with reference to the functional representations of FIGS. 4 and 5. FIGS. 4 and 5 show the interface 2 when the utensil 4 is in its neutral position and in its first inclined position, respectively. In these functional representations, the various elements of the interface 2 that were described with reference to the preceding figures have been represented by line drawings and have been designated by the same references.

In the absence of exterior stress, the springs 52 and 54 keep the fulcrums of the side-wings 60 and 80 simultaneously pressing against the abutments 82 and 84 of the body 6, respectively. The rocker 50 is therefore held in its rest position. When the rocker 50 is in its rest position, the slides 12A and 12B of the utensil 4 simultaneously press against the flats of the side-wings 60 and 80. The utensil 4 is therefore held in its neutral position.

When a user exerts a force F (FIG. 5) on the utensil 4 in the direction SAV, the utensil 4 moves to its first inclined position by rotating about the axis 10. The slide 12B then presses against and slides over the flat of the side-wing 80. The second portion of the sliding link is then in its engaged position. Thus, via this second portion of the sliding link, the utensil 4 pushes the side-wing 80 downward. The spring 54 compresses and the fulcrum of the side-wing 80 no longer presses against the abutment 84. The slide 12A moves away from the flat 64 of the side-wing 60 and no longer makes contact with the side-wing 60.

In parallel, the spring 52 keeps the fulcrum 62 of the side-wing 60 pressing against the abutment 82. The rocker 50 therefore rotates about the axis 86, which passes through the point where the fulcrum 62 of the side-wing 60 presses against the abutment 82. This rotational movement of the rocker 50 about the axis 86 also compresses the spring 52 since the accommodating region 68 is situated between the vertical planes containing the axes 10 and 86. The rocker 50 therefore moves to its first tilted position against the return forces of the springs 52 and 54.

When the user releases the utensil 4 and no longer exerts any force on this utensil, the springs 52 and 54 automatically return the rocker 50 to its rest position. When the rocker 50 returns to its rest position, the flat of the side-wing 80 pushes the slide 12B upward, this returning the utensil 4 to its neutral position.

When the spring 54 is broken, it no longer exerts any return force on the rocker 50. In contrast, the spring 52, which is not damaged, remains able to return, on its own, the rocker 50 to its rest position, both from the first tilted position and from the second tilted position. Thus, even when the spring 54 is broken, the interface 2 remains usable.

In addition, when the spring 54 is broken, the return force that urges the rocker 50 to its rest position is weaker than when the two springs 52 and 54 are intact. Thus, when the spring 54 is broken, the force that the user must exert to move the utensil 4 between the first and second inclined positions is smaller. The user then feels this difference in the return force and may trigger the appropriate maintenance operations before the spring 52 breaks in turn.

The operation of the interface 2 in the case where it is the spring 52 that is broken is the same as that described above in the case where it is the spring 54 that is broken.

Figure 6:
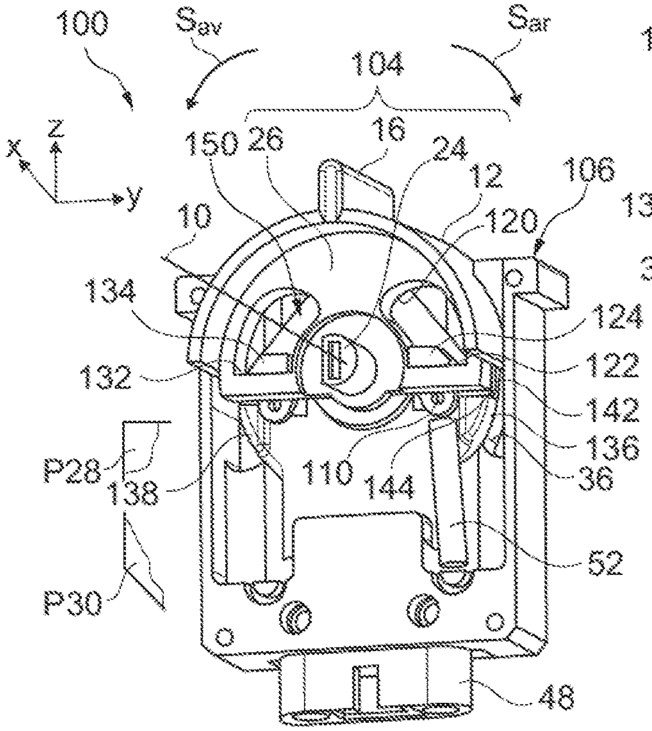
FIGS. 6 and 7 are partial illustrations, in perspective, of another human-machine interface.
Figure 7:
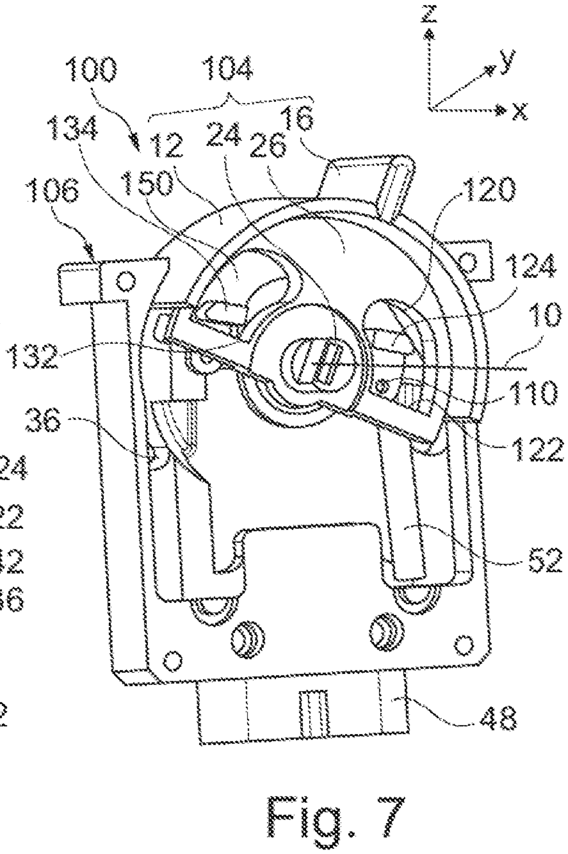

FIGS. 6 and 7 show a human-machine interface 100 that is identical to the human-machine interface 2 except that:

the utensil 4 has been replaced by a utensil 104, the body 6 has been replaced by a body 106, and the rocker 50 has been replaced by a rocker 150.

In this embodiment, the utensil 104, the body 106 and the rocker 150 are configured so that the springs 52 and 54 work in tension and not in compression. To simplify FIGS. 6 and 7, only the spring 52 has been shown. FIG. 6 shows the utensil 104 in its neutral position and the rocker 150 in its rest position. FIG. 7 shows the utensil 104 in its second inclined position and the rocker 150 in its second tilted position.

As in the embodiment of FIGS. 1 to 3, the interface 100 is symmetric with respect to the plane 28 and, in the neutral position, also symmetric with respect to the plane 30. Thus, below, only the elements situated in the portion to the right of the plane 30 are described in more detail.

The utensil 104 is, for example, identical to the utensil 4 except that the partition 26 comprises a window 120. The lower portion of the window 120 forms a flat 122 that is horizontal in the neutral position. A slide 124 of the rocker 150 presses against this flat 122 in the neutral position. The symmetric equivalents of the flat 122 and of the slide 124, with respect to the plane 30, have been designated by the references 132 and 134, respectively.

The body 106 is identical to the body 6 except that the abutments 82 and 84 have been replaced by abutments 136 and 138, respectively (FIG. 6). These abutments 136, 138 are situated under respective fulcrums of the rocker 150.

The rocker 150 is identical to the rocker 50 except that the fulcrum 62 has been replaced by a fulcrum 142 that is, in the rest position, forced against the abutment 136 by the return force of the spring 52. The abutment 136 is situated under the fulcrum 142. Similarly to how was described above, when the rocker 150 moves from its rest position to the second tilted position, the fulcrum 142 interacts with the abutment 136 to form a hinge that allows the rocker 150 to rotate about an axis 144 of rotation parallel to the axis 10. The orthogonal projection of the region for accommodating the upper end of the spring 52, in a plane containing the axes 10 and 144, is entirely situated between these two axes. Thus, the point of application of the return force of the spring 52 is situated between these two axes and distant from the axis 144 by a distance larger than 1 mm or 2 mm or 3 mm. Here, the accommodating region comprises a hole 110 inside of which the end of one turn of the spring 52 is received.

Figure 8:
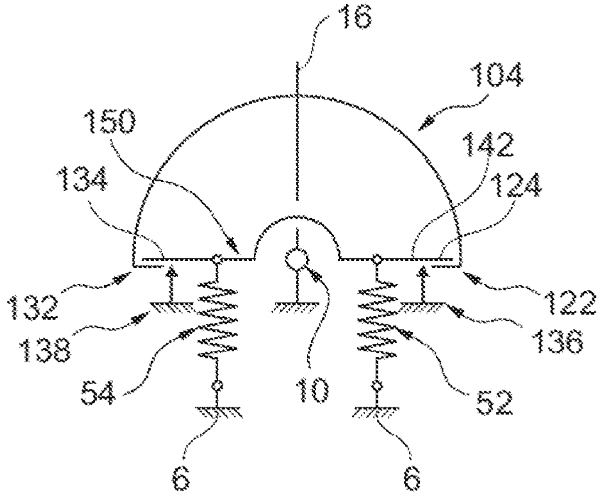
FIGS. 8 and 9 are functional diagrams of the human-machine interface of FIG. 6.
Figure 9:
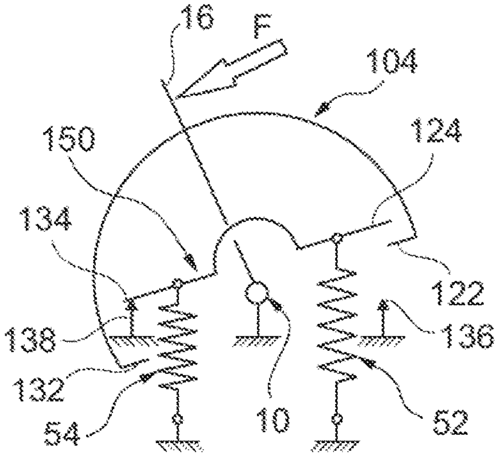

The operation of the interface 100 will now be described with reference to FIGS. 8 and 9. FIGS. 8 and 9 are functional representations of the interface 100. They show the interface 100 when the utensil 104 is in its neutral position and in its first inclined position, respectively.

In the absence of exterior stress, the springs 52 and 54 force the opposite fulcrums of the rocker 150 against the abutments 136 and 138, respectively. The flats 122, 132 then simultaneously press against the slides 124 and 134. The utensil 104 is therefore held in its neutral position.

When the user exerts a force F (FIG. 9) that moves the utensil 104 from its neutral position to its first inclined position, the flat 122 pulls the slide 124 upward. At the same time, the left-hand fulcrum of the rocker 150 remains pressed against the abutment 138. The rocker 150 therefore pivots, against the return forces of the springs 52 and 54, about the horizontal axis passing through this left-hand fulcrum against the abutment 138.

When the user releases the utensil 104, the springs 52 and 54 automatically return the rocker 150 to its rest position. When the rocker 150 returns to its rest position, the slide 124 presses against the flat 122, this simultaneously returning the utensil 104 to its neutral position.

As in the case of the interface 2, if the spring 54 breaks, since the point of application of the return force of the spring 52 is situated between the axes 10 and 144, the spring 52 is capable on its own of returning the rocker 150 to its rest position, both from the first tilted position and from the second tilted position.

Section II: Variants of the Utensil

Variants of the Utensil

The utensil 4 may take many different forms. For example, in a first variant, the lever 16 is omitted. In another variant, only the lever 16 is retained and the semi-circular face 12 is omitted. In the latter case, the utensil 4 is a lever and no longer a thumbwheel switch. However, even in the case of a simple lever, this lever is mechanically connected to the rocker by a sliding link such as that described in the case of the interface 2 or 100.

The utensil 4 may also comprise one or more push-buttons each movable between a proud position and a position depressed by a finger of the user when the latter grips the utensil 4.

In a simplified variant, the utensil is only movable between the neutral position and the first inclined position. In this case, the position of the region for accommodating the spring 54 along the left-hand portion of the rocker may be chosen arbitrarily. For example, in the case of the rocker 50, this accommodating region may be situated, further to the left, on a segment of the lower face of the side-wing 80 located beyond the abutment 84.

The teachings in respect of the particular case where the utensil 4 was only able to pivot about a single axis may also be applied to utensils able to pivot about a plurality of axes of rotation that are not parallel to each other and that all pass through the same point called the "center of rotation." This center of rotation is fixed, with no degree of freedom, with respect to the body of the interface. Thus, the teachings also apply to the case of a utensil able to pivot about the axis 10 and about an additional horizontal axis parallel to the Y-direction and intersecting the axis 10. In this case, all the teachings in respect of returning the utensil 4 to its neutral position after it has pivoted about the axis 10 are also applicable to returning the utensil 4 to its neutral position after it has pivoted about the additional axis. In particular, the return mechanism then comprises a pair of additional return springs, and the rocker in addition comprises two additional side-wings. These additional side-wings each extend parallel to the Y-direction and are situated on either side of the additional axis. The additional springs and the additional side-wings are arranged as described in the case of the side-wings and springs described above.

As a variant, the utensil may pivot about all the axes of rotation passing through the center of rotation. In the latter case, the mechanical link between the utensil 4 and the body is typically a ball-joint link. To ensure the return of the utensil to its neutral position, the return mechanism then comprises at least two pairs of springs placed as described in the preceding paragraph.

When the utensil is able to pivot about at least three non-collinear axes of rotation, the return mechanism may also comprise more than two pairs of return springs. In every case, each pair of springs is arranged as described in Section I in order to ensure that the utensil returns to its neutral position even if one of the springs of a pair breaks.

The utensil may also be designed to be moved other than by the hand of the user. For example, as a variant, the utensil is designed to be moved by the foot of the user. The utensil may also be moved between its neutral position and an inclined position by a robot, inter alia. Other variants:

Other embodiments of the sliding link are possible. For example, in one particular embodiment, the positions of the slide and of the flat are inverted. One of the slide and of the flat is then fastened to the rocker and the other of the slide and of the flat is fastened to the utensil.

Section III: Advantages of the Described Embodiments

When one of the springs 52, 54 breaks, it no longer exerts any return force on the rocker. However, in the embodiments described here, this does not prevent the utensil from returning to its neutral position in the absence of exterior stress on the latter. Thus, even if one of the springs 52, 54 breaks, the human-machine interface remains usable.

In addition, when one of the springs 52, 54 is broken, the force that a user must exert to move the utensil from its neutral position to one of its inclined positions is smaller. The user perceives this haptic feedback. He is therefore informed that one of the two springs 52, 54 is broken. This makes it possible to trigger the necessary maintenance operations before the other spring breaks and therefore before the interface is completely unusable.

By virtue of the use of the rocker in the return mechanism, regardless of the direction in which the utensil is inclined, the utensil rotates about the same axis or the same center of rotation. This facilitates the measurement of the angular position of the utensil. In addition, since the return springs are not directly fastened to the utensil, it is possible to uninstall the utensil without uninstalling the springs.

Placing the two regions for accommodating the springs between the axis 10 and the axes of rotation of the rocker allows the ability to return the utensil to its neutral position from either of the first and second inclined positions, respectively, to be retained.

The invention claimed is:

1. A human-machine interface comprising:
a body;
a utensil that is rotatable, by a user, in a first direction, about a first axis, from a neutral position to a first inclined position, the neutral position being the position of the utensil in the absence of exterior stress on the utensil;
a return mechanism for returning the utensil to its neutral position, the return mechanism comprising:
a first spring and a second spring that permanently urge the utensil to its neutral position;
a rocker suspended on the first spring and the second spring, the rocker being rotatable in the first direction, about a second axis, between a rest position in which the rocker holds the utensil in its neutral position and a first tilted position in which the utensil is in its first inclined position, the second axis being separate from and parallel to the first axis,
the rocker comprising a first side-wing and a second side-wing each situated on a respective side of a median plane containing the first axis,
the first side-wing and the second side-wing comprising a first region and a second region for accommodating one end of the first spring and the second spring, respectively,
an orthogonal projection of the second region, in a plane containing the first axis and the second axis, being entirely situated between the first axis and the second axis, and
the first spring and the second spring each comprising a first end fastened to the body and a second end received inside the first region and the second region, respectively,
wherein the return mechanism comprises a sliding link between the rocker and the utensil, the sliding link being able to convert a rotation, in the first direction, of the utensil to the first inclined position into a rotation, in the first direction, of the rocker to the first tilted position and to convert a movement of the rocker to its rest position into a movement of the utensil to its neutral position.

2. The interface as claimed in claim 1, wherein:
the utensil is rotatable, by the user, in a second direction opposite to the first direction, about the first axis, from the neutral position to a second inclined position,
the rocker is rotatable in the second direction about a third axis of rotation from its rest position to a second tilted position in which the utensil is in its second inclined position, the third axis being separate from and parallel to the first axis and situated, with respect to the median plane, on a side opposite to a side on which the second axis is found, and
the sliding link is also able to convert the movement of the utensil to the second inclined position into a movement of the rocker to the second tilted position.

3. The interface as claimed in claim 2, wherein:
the body comprises a first abutment and a second abutment situated in a location of the second axis and the third axis, respectively, and
the rocker further comprises:
a first fulcrum that is movable between:
an active position in which the first fulcrum presses against the first abutment to form, via interaction of a shape of the first fulcrum with a shape of the first abutment, a first hinge allowing the rocker to rotate about the second axis when the utensil is moved from its neutral position to its first inclined position, and
a distant position in which the first fulcrum is distant from the first abutment when the utensil is moved from its neutral position to its second inclined position, and
a second fulcrum that is movable between:
an active position in which the second fulcrum presses against the second abutment to form, via interaction with a shape of the second abutment, a second hinge allowing the rocker to rotate about the third axis when the utensil is moved from its neutral position to its second inclined position, and
a distant position in which the second fulcrum is distant from the second abutment when the utensil is moved from its neutral position to its first inclined position.

4. The interface as claimed in claim 2, wherein the sliding link comprises:
a first portion comprising a first slide and a first flat, the first slide being formed on one of the utensil and of the first side-wing, and the first flat being formed on the other of the utensil and of the first side-wing, the first portion of the sliding link being movable by the utensil between:
an engaged position in which the first slide slides over the first flat when the utensil is moved between its neutral position and its first inclined position, and
a disengaged position in which the first slide is away from the first flat when the utensil is moved between its neutral position and its second inclined position, and
a second portion comprising a second slide and a second flat, the second slide being formed on one of the utensil and of the second side-wing, and the second flat being formed on the other of the utensil and of the second side-wing, the second portion of the sliding link being movable by the utensil between:
an engaged position in which the second slide slides over the second flat when the utensil is moved between its neutral position and its second inclined position, and a disengaged position in which the second slide is away from the second flat when the utensil is moved between its neutral position and its first inclined position.

5. The interface as claimed in claim 2, wherein an orthogonal projection of the first region, in a plane passing through the first axis and the third axis, is entirely situated between the first axis and the third axis.

6. The interface as claimed in claim 2, wherein a distance between the third axis and a point of application to the first side-wing of a return force of the first spring is greater than 1 mm.

7. The interface as claimed in claim 1, wherein the first ends of the first spring and the second spring are fastened to the body in such a way that both the first spring and the second spring work in compression when the utensil is moved from its neutral position to either of its first inclined position and a second inclined position.

8. The interface as claimed in claim 1, wherein the first ends of the first spring and the second spring are fastened to the body so that the first spring and the second spring work in tension when the utensil is moved from its neutral position to either of its first inclined position and a second inclined position.

9. The interface as claimed in claim 1, wherein each of the first spring and the second spring is able, on its own, to return the rocker from either of its first tilted position and a second tilted position to its rest position in the absence of exterior stress.

10. The interface as claimed in claim 1, wherein a distance between the second axis and a point of application to the second side-wing of a return force of the second spring is greater than 1 mm.

11. The interface as claimed in claim 1, wherein the utensil is only rotatable about one or more axes that all pass through a same fixed point with respect to the body.

12. The interface as claimed in claim 1, wherein:

the first spring and the second spring are arranged to exert on the utensil, via the rocker, a first pressing force in a first direction perpendicular to the plane containing the first axis and the second axis, and the interface is devoid of complementary springs arranged to exert on the utensil a second pressing force in a second direction opposite to the first direction and the amplitude of which is within a range of between $0.9|F_1|$ and $1.1|F_1|$, where $|F_1|$ is the amplitude of the first pressing force.

* * * * *